(12) United States Patent
Mantin

(10) Patent No.: US 10,291,420 B2
(45) Date of Patent: May 14, 2019

(54) METHOD AND SYSTEM FOR MANAGING THE DELIVERY OF OVER-THE-TOP STREAMS

(71) Applicant: imVision Software Technologies Ltd., Ramat Gan (IL)

(72) Inventor: Sharon Mantin, Tel Aviv (IL)

(73) Assignee: imVision Software Technologies Ltd., Ramat Gan (IL)

(*) Notice: Subject to any disclaimer, the term of this patent is extended or adjusted under 35 U.S.C. 154(b) by 94 days.

(21) Appl. No.: 14/457,652

(22) Filed: Aug. 12, 2014

(65) Prior Publication Data

US 2015/0043580 A1  Feb. 12, 2015

Related U.S. Application Data

(60) Provisional application No. 61/864,724, filed on Aug. 12, 2013.

(51) Int. Cl.
*H04L 12/18* (2006.01)
*H04L 29/06* (2006.01)
*H04N 21/266* (2011.01)
*H04N 21/6405* (2011.01)
*H04N 21/6408* (2011.01)

(52) U.S. Cl.
CPC ........ *H04L 12/189* (2013.01); *H04L 65/4076* (2013.01); *H04L 65/4084* (2013.01); *H04L 65/80* (2013.01); *H04N 21/266* (2013.01); *H04N 21/26616* (2013.01); *H04N 21/6405* (2013.01); *H04N 21/6408* (2013.01)

(58) Field of Classification Search
CPC ... H04L 12/189; H04L 65/80; H04L 65/4076; H04L 65/4084; H04N 21/266; H04N 21/6405; H04N 21/6408; H04N 21/26616
See application file for complete search history.

(56) References Cited

U.S. PATENT DOCUMENTS 8,117,259 B2   2/2012  Macwan
2007/0147344 A1*  6/2007  Sundqvist ........... H04L 12/1877
                                                               370/352

(Continued)

FOREIGN PATENT DOCUMENTS

WO       2011143546 A2    11/2011

OTHER PUBLICATIONS

The International Search and The Written Opinion of the International Searching Authority for PCT/US2014/050699, ISA/RU, Russia, Moscow, dated Nov. 27, 2014.

(Continued)

*Primary Examiner* — Noel R Beharry
*Assistant Examiner* — Richard Schnell
(74) *Attorney, Agent, or Firm* — M&B IP Analysts, LLC

(57) ABSTRACT

A method and system for managing live, linear, and repetitive video stream transmissions in limited multicast resource systems are provided. The method includes monitoring OTT content streams flow in the broadband network; determining a delivery mode for each of the monitored OTT content streams, wherein the determination is based on at least one decision parameter, wherein the deliver mode is any one of a multicast mode and a unicast mode; and switching from a current delivery mode to the determined delivery mode when the current mode and determined delivery mode are not the same.

17 Claims, 7 Drawing Sheets

(56) References Cited

U.S. PATENT DOCUMENTS

| | | | |
|---|---|---|---|
| 2008/0056293 A1* | 3/2008 | Robbins | H04L 12/185 370/432 |
| 2009/0052450 A1 | 2/2009 | Mockett | |
| 2010/0167732 A1 | 7/2010 | Vakil et al. | |
| 2012/0131601 A1* | 5/2012 | McDysan | H04N 21/23805 725/1 |
| 2012/0259994 A1* | 10/2012 | Gillies | H04L 12/1881 709/231 |
| 2013/0132986 A1 | 5/2013 | Mack et al. | |
| 2013/0276017 A1* | 10/2013 | Walker | H04N 21/44204 725/25 |
| 2015/0327025 A1* | 11/2015 | Yamagishi | H04H 20/42 370/312 |

OTHER PUBLICATIONS

Bouten et al., "A Multicast-Enabled Delivery Framework for QoE Assurance of Over-The-Top Services in Multimedia Access Networks"; Journal of Network and Systems Management, DOI 10.1007/s10922-013-9262-8, published online Jan. 17, 2013; Springer Science+Business Media, New York.

* cited by examiner

METHOD AND SYSTEM FOR MANAGING THE DELIVERY OF OVER-THE-TOP STREAMS

CROSS-REFERENCE TO RELATED APPLICATIONS

This application claims the benefit of U.S. Provisional Application No. 61/864,724 filed on Aug. 12, 2013, the contents of which are hereby incorporated by reference.

TECHNICAL FIELD

The present invention relates generally to multicast transmissions in communication networks, and more particularly, to a method and system for managing live, linear, and repetitive video stream transmissions in systems with limited multicast resources.

BACKGROUND

The world of digital delivery of multimedia content to viewers has been rapidly progressing. Typical types of multimedia content include video clips, electronic games, and interactive content. The delivery process for such multimedia content, particularly those transmitted in a form of video, may entail use of a variety of delivery standards, video quality levels, and other parameters. The techniques used in traditional television (TV) broadcast cannot be effectively used in the more modern multi-standard digital TV arena. Currently, only piecemeal solutions are available for efficient and seamless delivery of such multimedia content, to the arena of digital TV.

Specifically, content delivery is currently performed using two approaches: legacy content distribution and over-the-top (OTT) content distribution. Legacy content providers include, for example, cable, satellite, and internet protocol TV (IPTV) providers. Typically, such providers have full control over the entire delivery chain, from a central location from where the content is originated and transmitted (head-end) through the network to the end user's device (e.g., a set-top box). Therefore, legacy content providers can manage and guarantee efficient content delivery mechanisms and high Quality of Experience (QoE) to the end user.

Over-the-top (OTT) content distribution is the delivery of audio, video, and other types of multimedia content over the Internet without any control of the content distribution by the network operators and/or by the content providers. The providers of OTT content are third party providers which utilize the network's infrastructure to provide content to their subscribers. As such, OTT content providers are not responsible for controlling redistribution of the content. Examples for OTT content providers are Hulu®, Netflix®, and the like.

In most cases, OTT content providers control only the edges of a content distribution network. These edges are streaming servers at the head-end and the media players installed in user devices. However, as noted above, OTT content providers have no control over the distribution network. Rather, such providers merely utilize the network's infrastructure to deliver content. As such, OTT content providers are not responsible for the overall efficiency of OTT content distribution over the network and, as such, cannot guarantee high QoE to their subscribers.

The popularity of OTT services downgrades the performance of the communication networks managed by ISPs. Specifically, OTT content delivery significantly increases the bandwidth consumption in such networks. As a result, ISPs cannot ensure high Quality of Services (QoS) to their subscribers, thereby forcing ISPs to upgrade their networks to support the increased demand for bandwidth. In addition, congested networks cause to higher packets loss and longer packet delays, thereby downgrading the QoE of OTT streaming services.

Broadcast transmissions have been in use around the world for over a century, since the invention of the radio by Marconi in 1895. In broadcast transmissions, a central site such as, e.g., a radio station, transmits content which all users in the network can receive. Multicast transmissions occur when only a certain subset of users in the network can receive certain content. Such situations may occur when, for example, a cable television operator offers a basic package to all of its subscribers, and a premium package (e.g., select sports and/or entertainment channels) that only certain subscribers (e.g., those who specifically pay for such content) can access. In such instances, the basic package is transmitted in broadcast mode, while the premium package is transmitted in multicast mode only to those subscribers who are entitled to the premium package.

In certain environments, there is no limitation on the number of different content items that can be transmitted in a multicast mode. For example, in Internet protocol (IP) based networks running over fiber optics, the number of multicast channels is limited by the theoretical number of approximately 8 million ($2^{23}$) multicast addresses, which are either derived from the range of multicast groups supported by IP version 4 (IPv4) addressing mechanisms for multicast (224.0.0.0 through 255.255.255.255) or from the range of multicast group supported by IP version 6 (IPv6) with the prefix ff00::/8, as per the Internet Engineering Task Force (IETF) Request for Comments (RFC) 5771. The IP multicast addresses are mapped to Ethernet multicast addresses in the range 01:00:5e:00:00:00 to 01:00:5e:7f:ff:ff, thereby implying that there are 23 bits of available address space.

The second limiting factor in a network is the total capacity of a physical link to the network. Additionally, fiber optic cables are capable of transmitting data using wavelength division multiplexer (WDM) technology. As a result, the physical link network's capacity also becomes a theoretical limitation. An operator may increase the capacity of the network by a factor of 8—using dense WDM (DWDM) technology. Thus, for practical purposes, a fiber optics operator is not limited in the number of multicast channels it can distribute over its network.

However, there are instances where the number of content items that require transmission in multicast mode is greater than the number of multicast channels available in that network. The immediate implication of such an instance is that a content item that cannot be served in a multicast mode over the network is transmitted to each and every user consuming the content in a unicast mode. Consequently, such transmission causes wasteful usage of the network's bandwidth. An important example of such an instance involves transmissions over cellular networks that have multicast capabilities, such as third generation (3G), long term evolution (LTE) networks, or any other fixed line network with multicast capabilities.

As illustrated in FIG. 1, an LTE radio frame 100 is transmitted once every 10 ms. The LTE frame 100 is sub-divided into 10 sub-frames 1 ms long each. When an enhanced Multimedia Broadcast Multicast Service (eM-BMS) is deployed in the network, the sub-frame is the smallest unit that can be allocated to multicast transmissions (see 3GPP TS 36.300 V11.6.0, Section 5). FIGS. 2 and 3 illustrate a LTE frame 200 implemented in frequency-division duplexing (FDD) mode and a LET frame 300 implemented in time-division duplexing (TDD) mode, respectively.

As further illustrated in FIGS. 2 and 3, respectively, the maximum number of allowed sub-frames to be allocated for a MBMS is 6 out of 10 in the case of LTE FDD, or 5 out of 10 in the case of LTE TDD. Significantly, allocating X sub-frames for a MBMS (X is less than or equal to 5 or 6 in the case of TDD and FDD, respectively) reduces the total capacity available for unicast traffic accordingly. Due to these constraints, a tradeoff in the dynamic allocation of multicast resources (e.g., MBMS or eMBMS resources) on a per service basis is crucial for guaranteeing a network's efficiency optimization in a dynamic environment.

FIG. 4 illustrates a multicast content distribution network for streaming multicast content. User equipment devices (UEDs) 410-1 through 410-N are connected in a cellular network 420 via multicast communication channels. In the cellular network 420 implements a multimedia broadcast multicast service (MBMS).

The UEDs 410, which are typically located in a cellular cell site 415, may be part of a network that includes all UEDs in multiple cell sites as part of a multicast broadcast single frequency network (not shown).

A media streaming server 440 generates and delivers media content in multicast streams to the UEDs 410 via several multicast routes 425-1 through 425-M. The media streaming server 440 provides managed OTT content which is owned by a network operator and is delivered by the network operator or through one of its partners. As such, the network operator controls the media streaming server 440 and, therefore, can determine if the delivered content can be multicasted, as well as the number of concurrent viewers of the streamed content.

The MBMS (also known as an eMBMS) is a standardized service which enables broadcast and multicast services of managed OTT content over cellular networks. A MBMS network defines a point-to-multipoint interface for existing and upcoming 3GPP-based cellular networks, such as those defined in the 3GPP standard specifications 3GPP TS 22.246, 43.246, 36.440, 25.346, 23.346, and 22.146. The MBMS is designed to provide efficient delivery of broadcast and multicast services, both within a cell as well as within the core network. For broadcast transmissions across multiple cells, the MBMS defines transmission via single-frequency network (SFN) configurations. Target applications include mobile television and radio broadcasting, as well as file delivery and emergency alerts. Delivery of content over the MBMS requires collaboration between the content owner and/or CDN and the cellular network operator.

One approach to improve the performance of broadband networks providing OTT services is to transmit OTT content or any other type of media content as multicast streams rather than unicast streams. Thus, due to the differences in efficiency of operation of unicast streams and multicast streams in different circumstances, some providers seek to switch from unicast to multicast format streams to minimize bandwidth consumption and improve end users' quality of experience (QoE). However, switching at appropriate times that improve streaming performance in such a manner, typically requires real-time monitoring of various parameters related to streaming content consumption. Furthermore, switching from unicast streams to multicast streams in some cases can downgrade the efficiency of the delivered content. Thus, a decision mechanism should take place in order to improve determine if a media stream, such as an OTT content stream should be delivered as multicast streams.

SUMMARY

The disclosed embodiments include a method for managing delivery of over-the-top (OTT) content streams over a broadband network. The method comprises monitoring OTT content streams flow in the broadband network; determining a delivery mode for each of the monitored OTT content streams, wherein the determination is based on at least one decision parameter, wherein the deliver mode is any one of a multicast mode and a unicast mode; and switching from a current delivery mode to the determined delivery mode when the current mode and determined delivery mode are not the same.

The disclosed embodiments also include a system for managing delivery of over-the-top (OTT) content streams over a broadband network. The system comprises: a processing unit; and a memory, the memory containing instructions that, when executed by the processing unit, configure the system to: reformatting the at least one of the OTT content streams into at least one multicast OTT stream; instructing user edge devices connected to broadband network to expect the reception of the at least one multicast OTT stream; and delivering the at least one multicast OTT stream to the user edge devices over the broadband network.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
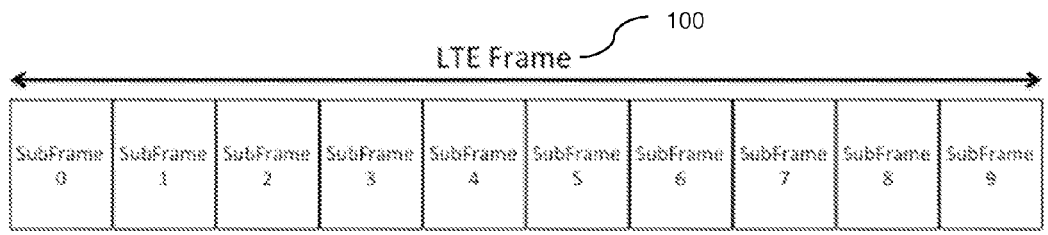
FIG. 1 is a diagram illustrating the structure of a long term evolution frame (LTE)
Figure 2:
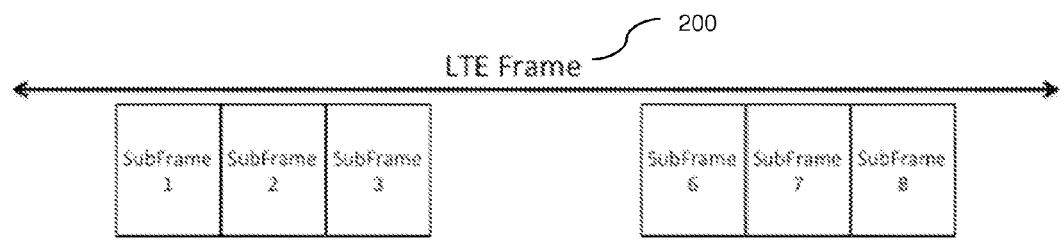
FIG. 2 is a diagram illustrating the maximum possible number of sub frames of a LTE frame allocated for an electronic multimedia broadcast multicast service in frequency-division duplexing mode.
Figure 3:
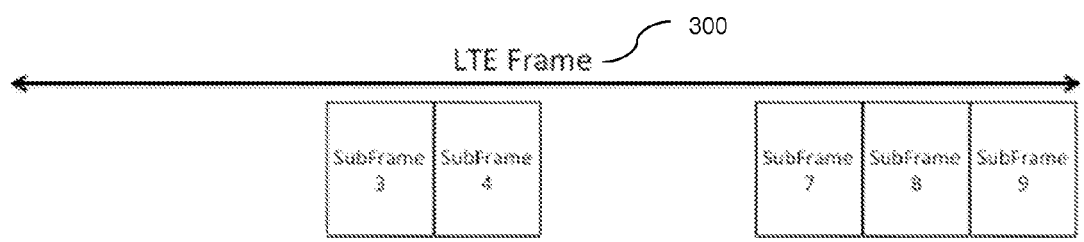
FIG. 3 is a diagram illustrating the maximum possible number of sub frames of a LTE frame allocated for an enhanced multimedia broadcast multicast service in time-division duplexing mode.
Figure 4:
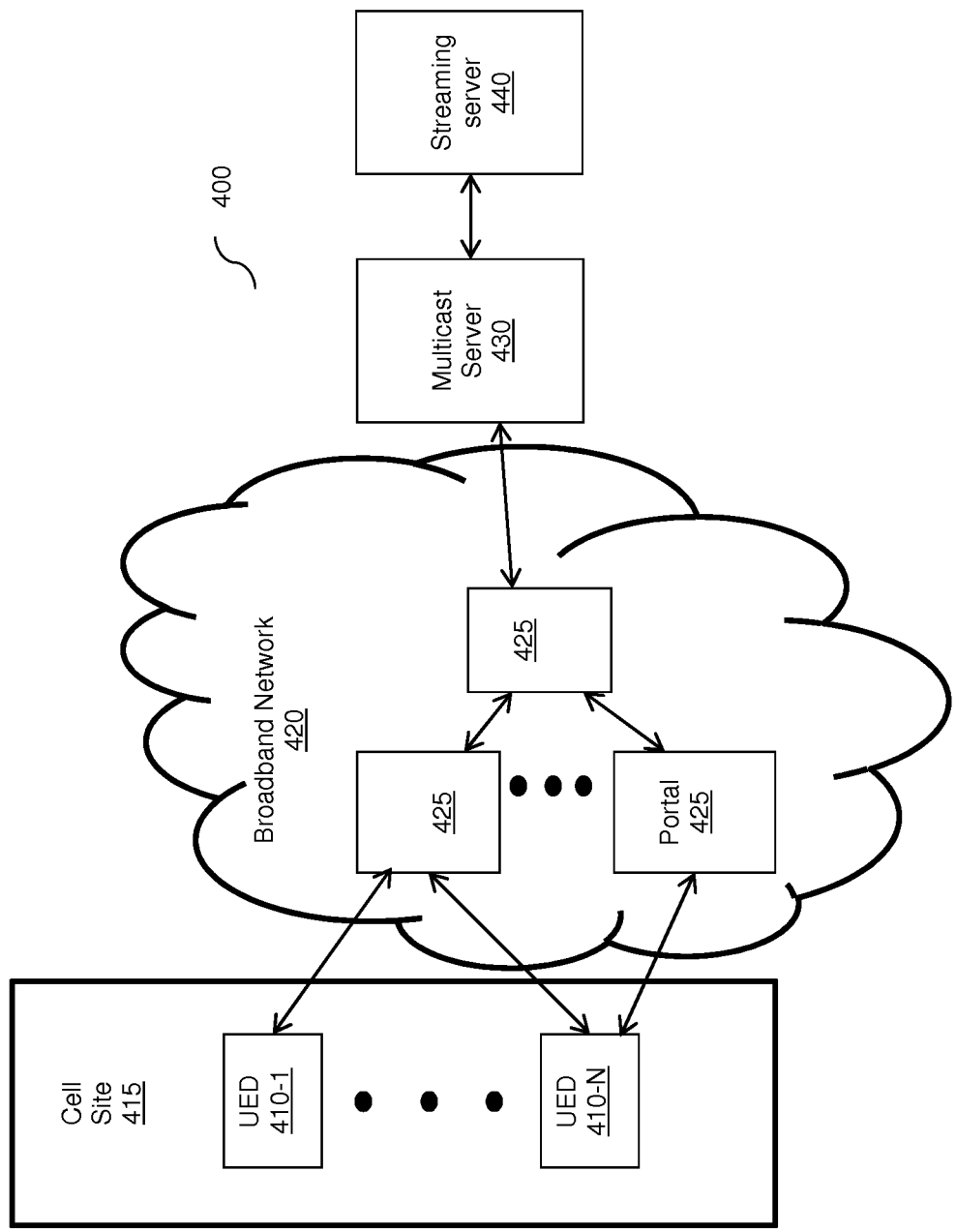
FIG. 4 is a system for streaming multicast content.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for determining efficiency of multicast streams including, but not limited to, OTT content streams. In an embodiment, the method and system further determine if an OTT content stream should be delivered over the network as a multicast stream. By delivering multicast streams based on the determination provided by the method and apparatus, the communication bandwidth is reduced, and transmission quality and qualities of experience (QoE) are improved. In an embodiment, multimedia (video/audio) OTT streams which should be delivered as OTT streams include live, linear, or replicated OTT streams (such streams commonly referred to hereinafter as a "live OTT stream").

It should be noted that, although the disclosed embodiments may be described with respect to one or more networks (e.g., cellular networks, fixed-line networks, and other broadband networks), such embodiments are not necessarily limited to those described networks. Moreover, any components associated with such networks (e.g., an MBMS associated with a cellular network) may be unused or used without departing from the scope of the disclosed embodiments.

Figure 5:
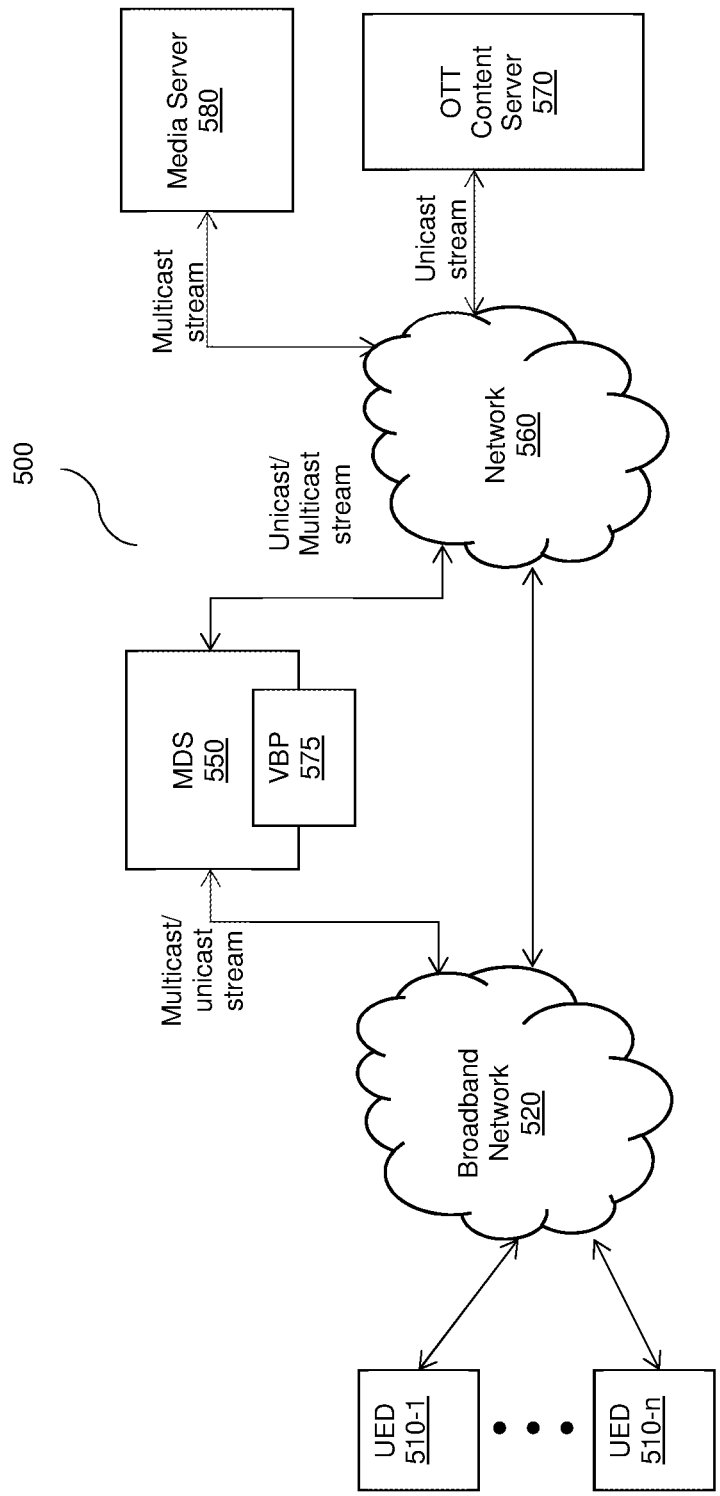
FIG. 5 is a schematic diagram of a content distribution network utilized to describe the various disclosed embodiments.

FIG. 5 is an exemplary and non-limiting schematic diagram of a content distribution network 500 utilized to describe the various embodiments disclosed herein. In an exemplary implementation, the network 500 includes a plurality of user edge devices (UEDs) 510-1 through 510-N configured to play content (e.g., video content) streamed by an OTT content provider from an OTT content server 570. Each UED 510 may be, but is not limited to, a personal computer (PC), a smart phone, an electronic kiosk, a tablet computer, a wearable computing device, a smart TV, and the like. Each UED 510 is configured to execute a media-player from any one of a web-browser, an application (e.g., a mobile app), and the like.

The UEDs 510 are further connected to a broadband network 520. In an exemplary embodiment, the broadband network 520 may be a fixed-line network, a cellular network and/or any other network such as, but not limited to, a wireless network (e.g., a WLAN). The fixed-line network is based on infrastructure including, but not limited to, cable, fiber optic, digital subscriber line (DSL), or any other communication network allowing connectivity of end users to the Internet. The cellular network may be operated according to the communication standards defined in any one of the WCDMA, TD-CDMA, TD-SCDMA, and LTE. The cellular network may implement MBMS services. The broadband network 520 is typically operated by any of an internet service provider (ISP), a telecom network provider, a cable television (TV) provider, and the like. It should be noted that the connectivity of UEDs such as UED 510 to the broadband network 520 is typically through a local area network (LAN), a wireless LAN (WLAN), and the like.

At the other end of the system, the OTT content server 570 is also communicatively connected to a multicast delivery system (MDS) 550 through a network 560. The network 560 may be a local area network, a wide area network (WAN), a metropolitan area network (MAN), the Internet, and the like. The OTT content server 570 locally hosts or receives the multimedia content from its origin (e.g., a studio, not shown) in real-time. The OTT content server 570 is configured to stream this content as an OTT content stream to the UEDs over the networks 520 and 560 as unicast streams. OTT content servers (e.g., OTT content server 570) are typically deployed in datacenters in different geographical locations. Although not shown in FIG. 5, OTT content servers are typically connected to content distribution networks (CDNs).

Also connected to the content distribution network 500 is a media server 580 that provides managed content. The operator of the broadband network 520 controls the operation of the media server 580. Typically, the media server 580 delivers the managed content as multicast streams.

In an embodiment, the MDS 550 is configured to execute the disclosed embodiments of methods for efficient delivery of OTT streams and, in particular, of multicast-able OTT streams. The operation of the MDS 550 allows reduction of the bandwidth consumption and improves the performance of the broadband network 520 when delivering OTT streams to the UEDs. The OTT content server 570 streams unicast OTT streams to UEDs (e.g., the UED 550). The MDS 550 monitors requests from the UED 550 for OTT streams and responses from the OTT content server 570 to determine if such requests and responses are related to multicast-able OTT streams. As noted above, multicast-able OTT streams include live, linear, replicated, duplicated, or other multicast-able OTT streams.

In one embodiment, the MDS 550 is configured to determine the efficiency of multicasting of such detected multicast-able OTT streams. If the MDS 550 determines that the delivery of the live stream in its multicast format would likely improve the performance of the broadband network 520, the MDS 550 switches the delivery mode from a unicast to a multicast format and delivers the respective multicast OTT stream to its destination, i.e., UEDs (e.g., the UEDs 510) over the broadband network 520. The MDS 550 can further make a determination of whether a unicast OTT content stream should be delivered as a multicast OTT content stream. The determination is based on one more decision parameters including, but not limited to, a type of the OTT content stream, viewing behavior with respect to the content, a number of subscribers viewing the OTT content stream, multicast resources availability in the broadband network, bandwidth consumption, and so on. The MDS 550 is further configured to monitor changes in the decision parameters to determine if a switch of the delivery mode should occur. The operation of the MDS 550 is described further herein below with reference to FIGS. 6 and 7.

In some embodiments, the MDS 550 may include a viewing behavior pattern (VBP) learning mechanism 575. The VBP learning mechanism 575 monitors and stores one or more parameters related to a viewing behavior such as, but not limited to, content types, numbers or proportions of viewers viewing a particular type of content, time, and so on. Based on the monitored data, the VBP learning mechanism 575 may continuously and/or periodically generate data curves and graphs as described further herein below with respect to FIGS. 8 and 9.

Figure 6:
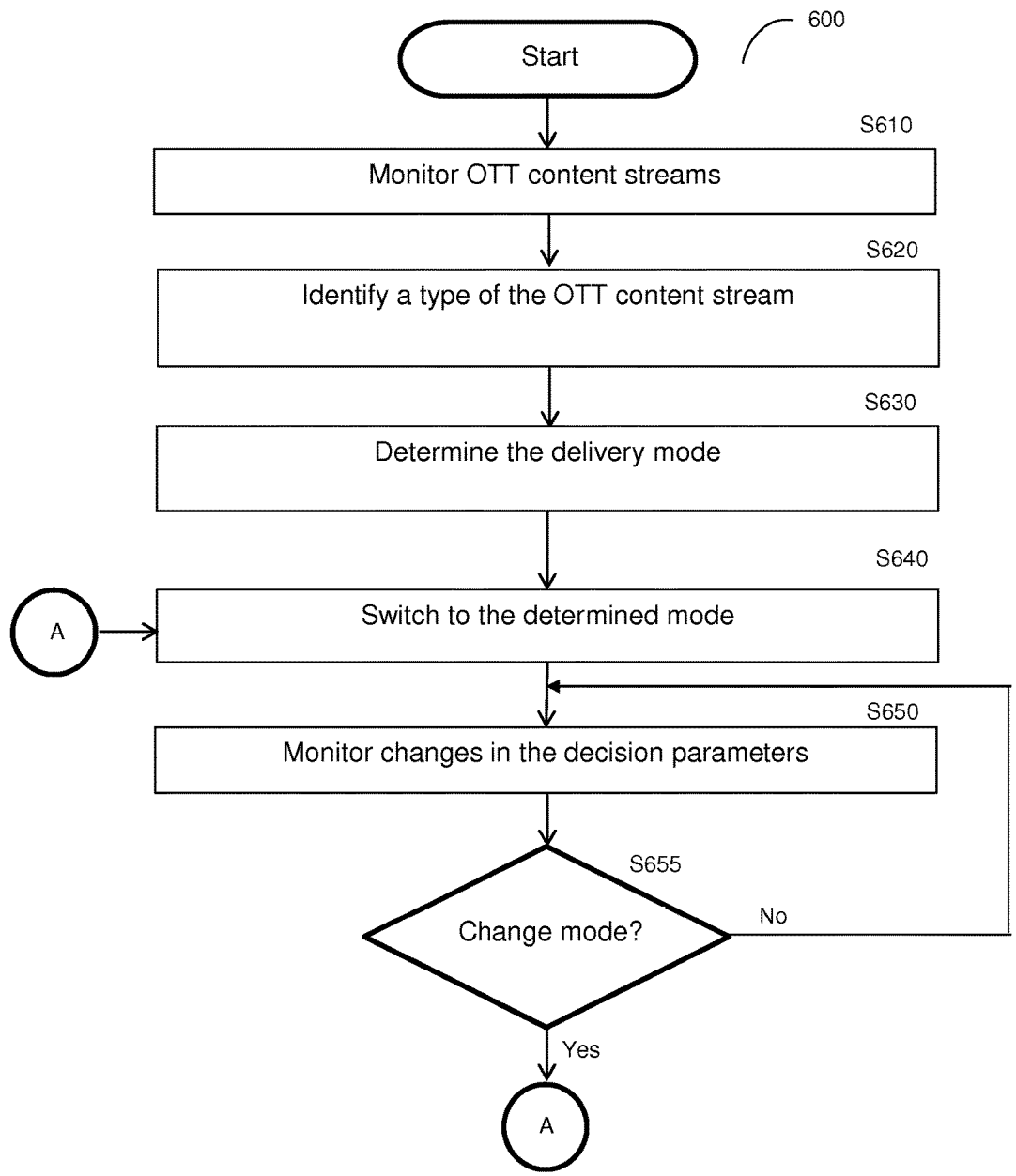
FIG. 6 is a flowchart illustrating for managing delivery of OTT content streams over a broadband network according to one embodiment.

FIG. 6 is an exemplary and non-limiting flowchart 600 illustrating a method for managing delivery of OTT content streams over a broadband network according to an embodiment. In an embodiment, the management of the content delivery includes determining a streaming mode for delivering OTT content. The streaming mode may be a unicast mode or a multicast mode.

In S610, OTT content streams flow to and from a broadband network are monitored. In one embodiment, such streams can be forwarded by a deep packet inspection (DPI) element, a service chaining element, or a routing network element. The forwarding decision by any of these elements is based on a set of rules such as, but not limited to, a destination IP address designated in the request. The destination IP address may be, for example, an IP address of an OTT content server.

In S620, a type of each monitored OTT stream is identified. In an embodiment, such a determination may include identifying if a type of a requested or otherwise delivered stream can be transmitted in a multicast format, that is, if the stream is a multicast-able OTT stream. In various embodiments, multicast-able streams which are suitable for multicast streaming include, but are not limited to, live, linear, and replicated streams, as well as any other streams which may be multicasted. A live OTT stream is a transmission of a live event (e.g., a sports match, a concert, and so on). A linear stream is a broadcasted content, such as a TV show broadcasted over the Internet (e.g., news, morning show). In both live and linear OTT streams, all viewers watch the same stream at the same time. Replicated OTT streams are different OTT streams of the same content. In an embodiment, the type of content may be useful in determining a source to retrieve the content from. An exemplary implementation of S620 can be found in U.S. patent application Ser. No. 14/332,712 filed on Jul. 16, 2014, assigned to the common assignee, and hereby incorporated by reference for all that it contains.

In S630, the delivery mode that should be used for delivering the OTT content stream is determined. The determination is made based on a plurality of decision parameters including, but not to limited to, viewing behavior of the content, number of subscribers viewing the contents, multicast resource availability in a network, bandwidth consumption, and so on. Determining which mode should be used for distributing content is further described herein below with respect to FIG. 7.

In S640, the delivery of the OTT content stream is switched to the determined mode. That is, if a live OTT content stream originating from an OTT content server is a unicast format and the determination is that a multicast mode should be applied, the stream is reformatted to a multicast format, and the multicast OTT stream is delivered to the UEDs. If it is determined that the multicast mode is not an efficient mode for delivering the OTT content stream, the stream is delivered in a unicast mode. In an embodiment, if the determined mode is the currently used mode of streaming, no switch is performed.

In S650, the OTT content stream is monitored to determine if any of the decision parameters evaluated in S630 has been changed such that a switch over should occur. For example, it is checked if one or more of the viewing behavior of the content, the number of UEDs viewing the contents, the multicast resource availability in a network, and the bandwidth consumption have been changed such that a current multicast or unicast mode has become inefficient and a switchover is required. In S655, it is checked whether the current mode should be changed. If so, execution continues with S640 where a switch back occurs; otherwise, execution returns to S650. It should be noted that the method for monitoring streams may be terminated where no requests for the OTT content streams are detected.

Figure 7:
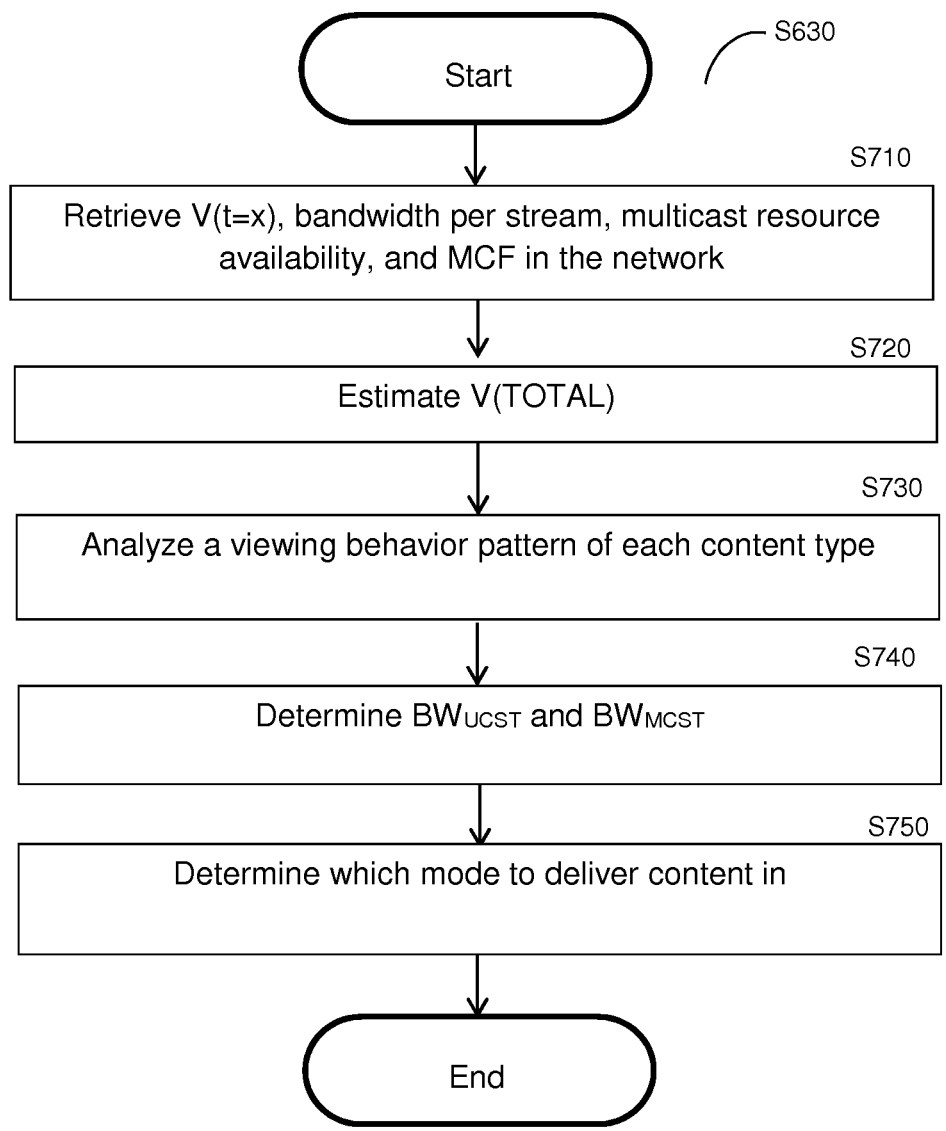
FIG. 7 is a flowchart illustrating a method for a delivery mode selection according to one embodiment.

FIG. 7 is an exemplary and non-limiting flowchart S630 illustrating determination of which mode to distribute content in according to an embodiment. In S710, various decision parameters such as, but not limited to, a number of requests per content, a bandwidth per stream, multicast resources availability in the broadband network, a percentage of viewers in a specific network segment, and a multicast cost factor (MCF) are determined In an embodiment, the number of requests per content is equal to the number of requests received as of a time 'x' at which the number of requests per content is retrieved and may be designated as V(t=x).

In various embodiments, the bandwidth per stream is the bandwidth required for each stream being served based on a quality level. For the sake of explanation, the quality level may be designated as $Y_1, Y_2, \ldots, Y_n$. As a non-limiting example, the amount of bandwidth required for each high quality video stream may be $Y_1=2$ Mbps, the amount of bandwidth needed for each medium quality video may be $Y_2=1$ Mbps, and the amount of bandwidth needed for low quality video may be $Y_3=0.5$ Mbps.

The multicast resource availability (MRA) is typically important for networks with limited multicast resources such as, but not limited to, LTE networks using eMBMS technology. In an embodiment, the determination of whether to stream the content in unicast or multicast format is affected by the MRA in the network. As an example, if the number of multicast streams needed would exceed a number of multicast channels (determined based on MRA of the network), some or all of the streams may be delivered in unicast format.

The MCF is a minimum multicast (such as, e.g., eMBMS) channel bandwidth allocation that can be configured in a specific network according to the operator policy. Such a bandwidth is equal to the minimum bandwidth consumed by a single allocation of a multicast resource, even if the resource is not fully utilized. As a non-limiting example, in a LTE network, an eMBMS resource can be configured in two dimensions: 1) the number of eMBMS sub-frames (up to 5 in LTE TDD or 6 in LTE FDD) within one radio frame; and 2) eMBMS periodic transmission over radio frames (i.e., once every 1, 2, 4, 8, 16, or 32 frames). Thus, theoretically, the eMBMS channel would be able to consume $\frac{1}{320}$ of the total cell capacity in a minimal configuration (only one of the ten sub-frames at once per 32 radio frames), and $\frac{6}{10}$ of the total cell capacity in a maximal configuration (all 6 possible sub-frames at once every one radio frame).

In S720, a potential number of subscribers (using UEDs 410) that may consume the content is estimated. In an embodiment, the potential number of subscribers that may consume the intent may be computed as follows:

$$V(TOTAL)=V(t=x)/F(t=x) \qquad \text{Equation 1,}$$

where, V(TOTAL) is the potential number of subscribers that will consume the OTT content stream, V(t=x) is the number of requests for the OTT content stream under evaluation that have been received as of time t=x, and F(t=x) is the percentage of viewers in the specific network segment (e.g., an LTE cell, multicast-broadcast single frequency network, and so on) at time t=x. The time 'x' may be determined respective of, but not limited to, when the request for OTT content stream was received relative to when any streaming began, and so on.

As a non-limiting example, a request for an OTT content stream is received from a first viewer at time x=0. At time x=500 seconds, a request for the OTT content from another viewer is received. Between x=0 and x=500, 48 requests for the OTT content were received. Thus, a total of 50 requests for the OTT content had been received as of time x=500. Additionally, the percentage of viewers in the network segment offering the content is 50%. As a result, the potential total number of subscribers that will consume the content is V(TOTAL)=(50)/(0.5)=100.

In S730, a viewing behavior pattern for each content type is analyzed. In an embodiment, the viewing behavior pattern may be represented in a graphical form. An exemplary and non-limiting graph illustrating a viewing behavior pattern for a content type is described further herein below with respect to FIG. 8. Such a graph represents various values of the viewing behavior pattern, where a viewing behavior pattern may be, but is not limited to, a percentage, a numerical value, and so on. In a typical embodiment, the viewing behavior pattern V=F(t) is a percentage reflecting the changes in viewing behavior patterns over time. In various embodiments, the viewing behavior pattern is developed and adaptively modified based on information accrued based on, but not limited to, prior events, geography, type of content, and so on. Development of viewing behavior patterns is described in further detail herein below with respect to FIG. 8.

In S740, a total bandwidth consumption assuming unicast distribution (hereinafter "$BW_{UCST}$") and a total bandwidth consumption assuming multicast distribution (hereinafter "$BW_{MCST}$") of the OTT content stream is determined. In an embodiment, $BW_{UCST}$ is computed as follows:

$$BWUCST(t)=Yn*V(\text{TOTAL}) \quad \text{Equation 2,}$$

where, Yn is a stream quality dictated by the network operator, and V(TOTAL) is the potential total number of subscribers that will consume the content, as computed by Equation 1.

In an embodiment, $BW_{MCST}$ is computed as follows:

$$BWMCST(t)=Yn*COF \quad \text{Equation 3,}$$

where Yn is the stream quality dictated by the network operator, and the COF is the channel overhead factor.

In multicast transmissions, a transmitter providing the multicast content is typically adjusted for the worst-case scenario. This means that the transmitter sends packets with forward error correction capabilities as well as packet retransmissions according to the receiver (e.g., a user's received) with the worst reception conditions. The COF represents the overhead that is caused by such adjustment, and may be, but is not limited to, a numerical value (e.g., 1, 1.5, 1.75, 2, and so on).

As a non-limiting example, in a LTE cellular network with MBMS capability, the COF is equal to 1/(eMBMS throughput), where the eMBMS throughput is based on the worst performing link in the sector because, at most, multicast streaming in each link consumes an amount of resources equivalent to that of the worst link. In that example, if eMBMS throughput in an area is assumed to be 59% of the average unicast throughput when using the same amount of a streaming spectrum, then the COF would be 1/0.59=1.695.

In S750, it is determined which mode the OTT content stream should be delivered in. In an embodiment, the OTT content stream should be delivered in a multicast mode if a computed value of $BW_{UCST}$ is greater than the MCF as well as a computed value of the $BW_{UCST}$ is greater than the $BW_{MCST}$ value. If the value $BW_{UCST}$ is less than the MCF or if $BW_{UCST}$ value is less than the $BW_{MCST}$ value, the OTT content stream should be distributed in a unicast mode.

As a non-limiting example, 20 subscribers are expected to consume a specific content, wherein the operator's policy is to serve the users at high quality video. In this example, high quality video uses bandwidth of Y1=2 Mbps per subscriber. Thus, $BW_{UCST}$=Y1*V(TOTAL)=20*(2 Mbps). 40 Mbps.

Additionally, in this example, the COF is 2. Thus, $BW_{MCST}$=Y1*COF=(2 Mbps)*2=4 Mbps.

Additionally, in this example, the channel for content delivery has a capacity of 5 Gbps, wherein the minimum portion of the capacity that can be allocated to multicast is 1%. Thus, MCF=(5 Gbps)*(0.1)=50 Mbps. Therefore, it is determined that the content should be delivered in unicast format because $BW_{UCST}$ is not greater than MCF. This determination improves the viewer's experience since, although transmission of content in multicast format only requires 4 Mbps as opposed to the 40 Mbps needed for 20 separate unicast streams, the minimum amount of capacity that will be allocated exceeds the amount required.

In an embodiment, $BW_{UCST}$, $BW_{MCST}$, and MCF may be monitored after the determination is made. In such embodiments, if $BW_{UCST}$ is less than MCF or if the $BW_{UCST}$ is less than the $BW_{MCST}$ for a continuous period of time, all viewers may be switched back to receiving content in unicast mode. The continuous period of time may be, but is not limited to, a predetermined period of time (e.g., 1 second, 5 seconds, one minute, and so on).

Figure 8:
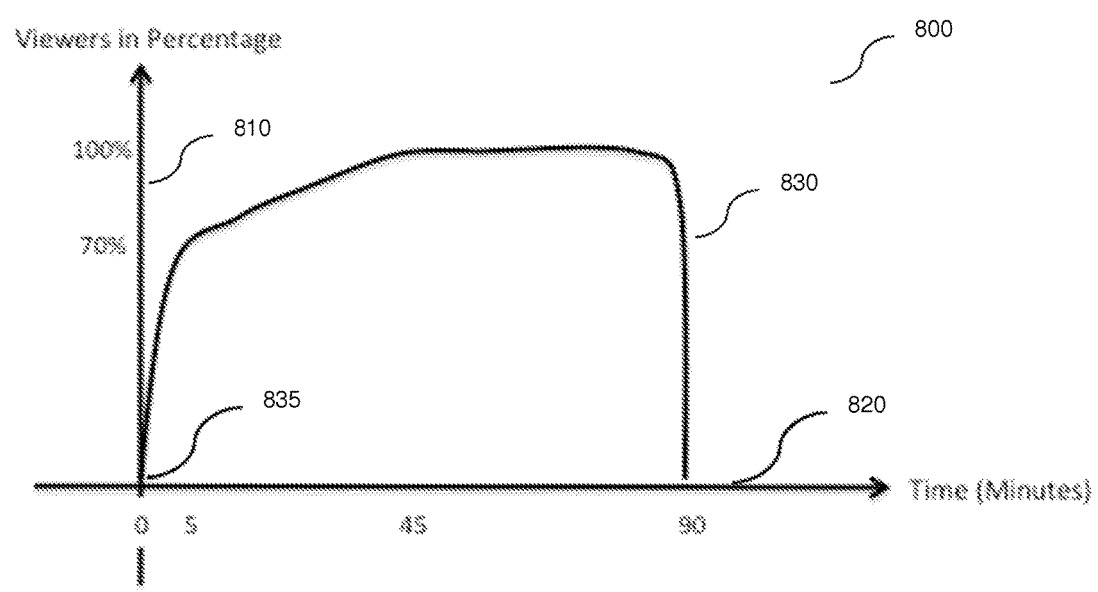
FIG. 8 is a graph illustrating a viewing behavior pattern according to an embodiment.

FIG. 8 is an exemplary and non-limiting graph 800 of a viewing behavior pattern (VBP) according to an embodiment. The graph 800 includes Y-Axis 810, X-Axis 820, adaptive data curve 830, and data point 835.

In an embodiment, the Y-Axis 810 represents a number or proportion of viewers requesting certain content. In a further embodiment, the proportion may be represented as, e.g., a percentage of the total number of potential viewers. The Y-Axis is typically denoted as F(t). The X-Axis 820 typically represents a time period over which content is requested and may be, but is not limited to, in seconds, minutes, hours, days, weeks, months, years, and portions thereof. The X-Axis is typically denoted as t. Generation of the data curve 830 based on one or more data points is described further herein below with respect to FIG. 9.

The data curve 830 represents the values of data at various point in during a given time period. Such data values further represent the viewing behavior pattern for that time period. In various embodiments, multiple data curves may exist on the same graph or on separate graphs, with each data curve typically representing a different content type (e.g., sports game, news, and so on).

The adaptive data curve 830 typically starts with the data point 835, which represents the initial values of data for the data curve 830. This value may be initialized to null (0), or may be set at a particular value. In an embodiment, part or all of the curve may be derived based on a default viewing behavior pattern (DVBP, not shown). The DVBP may be or include the data point 835. The DVBP may be set as null (i.e., set as constant with F(t)=0), or may be determined based on reference to other sources such as, e.g., a source of cable TV, and so on.

Figure 9:
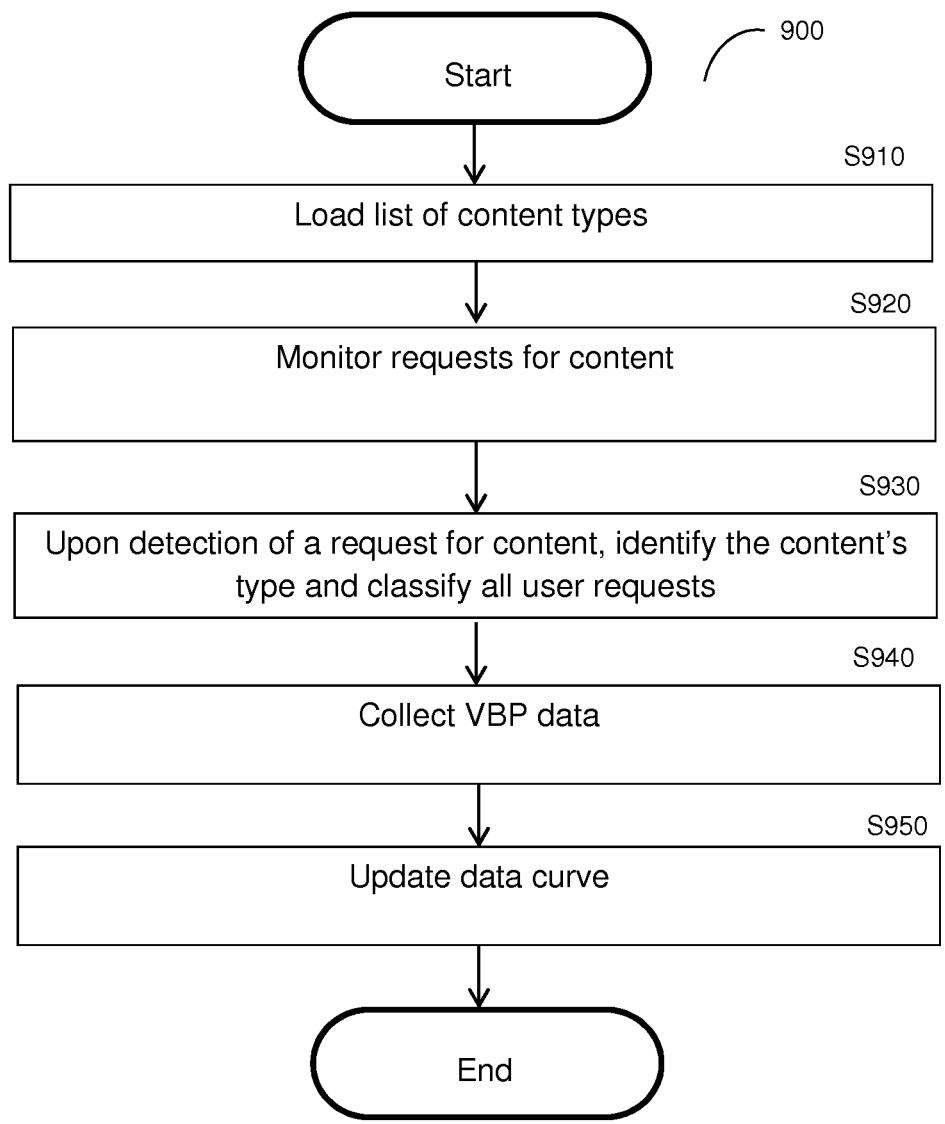
FIG. 9 is a flowchart illustrating generation of a data curve according to an embodiment.

FIG. 9 is an exemplary and non-limiting flowchart 900 illustrating generation of an adaptive data curve (e.g., the data curve 830) according to an embodiment.

In S910, a list of content types is loaded. Such content types may be, but are not limited to, live, linear, or replicated stream of football games, basketball games, news, morning shows, and so on. In an embodiment, if a list of content types is already defined, the list of content types may either be updated, but not loaded. Data curves may be generated, but are not limited to, per content type, per source of content, per day in the week, per time of day, combinations thereof, and so on.

Sources of content may include, but are not limited to, a live or linear TV or IPTV program, or a live or linear program from an internet website. In various embodiments, when a source of content featuring a new content type is detected, the new content type may be added to the list of content types.

For each data curve, a default viewing behavior pattern (DVBP) is set. The default viewing pattern may be a single point or a set of points, and may be equal to null (i.e., all points have an F(t) value of 0), or may be set based on, e.g., information obtained from another source of content.

In S920, requests for content are monitored. In S930, upon detection of a request for content, the content's type is identified and all user requests are classified. Classification of user requests may be based on, but is not limited to, the source that requested content is located in. As a non-limiting example, requests for content from www.nbl.com (the national basketball league's website) may be classified as content type "basketball game," and any DVBPs and/or VBP data needed may be obtained via this website.

In S940, VBP data is collected from, e.g., the source of the requested content. The data which may be collected is described further herein above with respect to FIG. 8. In S950, respective of the collected data, the data curve is updated. In an embodiment, updating the data curve further involves updating a graph the data curve appears on.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for managing delivery of over-the-top (OTT) content streams over a broadband network, comprising:
   monitoring OTT content streams flow in the broadband network, wherein the OTT content streams flow includes requests for OTT content streams and responses to the requests;
   determining, based on the requests and responses, a type of each monitored OTT content stream;
   determining a delivery mode for each of the monitored OTT content streams, wherein the determination is based on at least one decision parameter, wherein the delivery mode is any one of: a multicast mode, and a unicast mode,
      wherein the at least one decision parameter includes multicast resources availability in the broadband network, the type of each monitored OTT content stream, and a current demand for each monitored OTT content stream,
      and wherein, the current demand is based on a number of current subscribers viewing the respective OTT content stream and on an adaptive viewing behavior pattern of the OTT content stream,
      and wherein the adaptive viewing behavior pattern is determined based in part on a content type of a program being streamed; and
   switching from a current delivery mode to the determined delivery mode when the current mode and the determined delivery mode are not the same.

2. The method of claim 1, further comprising:
   monitoring changes in any of the at least one decision parameter; and
   switching the delivery mode back based on the monitored changes.

3. The method of claim 1, wherein the current delivery mode is a unicast mode and the determined mode is a multicast mode, wherein the determined mode is the multicast mode when the type of OTT stream is any one of: a live OTT stream, a linear OTT stream, and a replicated OTT stream.

4. The method of claim 1, wherein determining the delivery mode further comprising:
   computing an estimated number of subscribers viewing the OTT content stream;
   computing, based in part on the estimated number of subscribers, a total bandwidth consumption for delivering the OTT content stream in a unicast mode ($BW_{UCST}$) value;
   computing a total bandwidth consumption for delivering the OTT content stream in a multicast mode ($BW_{MCST}$) value; and
   determining the delivery mode to be either the multicast mode or the unicast mode based, in part, on the $BW_{UCST}$ and $BW_{MCST}$ values.

5. The method of claim 4, wherein the estimated number of subscribers is computed based on an adaptive viewing behavior pattern of the OTT multicast stream.

6. The method of claim 1, wherein the adaptive viewing behavior pattern is further determined based on at least one of: prior events related to the OTT multicast stream, geography of the subscribers, and a type of content of the OTT multicast stream.

7. The method of claim 1, wherein the broadband network includes any one of: a cable network, a fiber optic network, a wireless local area network, a digital subscriber line (DSL) network, a cellular network, and any other wireless network.

8. The method of claim 1, wherein the multicast resources availability in the broadband network include a number of available multicast channels in the broadband network.

9. A non-transitory computer readable medium having stored thereon instructions for causing one or more processing units to execute the method according to claim 1.

10. A system for managing delivery of over-the-top (OTT) content streams over a broadband network, comprising:

a processing unit; and a memory, the memory containing instructions that, when executed by the processing unit, configure the system to:

monitor OTT content streams flow in the broadband network, wherein the OTT content streams flow includes requests for OTT content streams and responses to the requests;

determine, based on the requests and responses, a type of each monitored OTT content stream;

determine a delivery mode for each of the monitored OTT content streams, wherein the determination is based on at least one decision parameter, and wherein the delivery mode is any one of: a multicast mode, and a unicast mode, and wherein the at least one decision parameter includes multicast resources availability in the broadband network, the type of each monitored OTT content stream, and a current demand for each monitored OTT content stream; and switch from a current delivery mode to the determined delivery mode when the current mode and the determined delivery mode are not the same.

11. The system of claim 10, wherein the system is further configured to:

monitor changes in any of the at least one decision parameter; and switch the delivery mode back based on the monitored changes.

12. The system of claim 10, wherein the current delivery mode is a unicast mode and the determined mode is a multicast mode, wherein the determined mode is the multicast mode when the type of OTT stream is any one of: a live OTT stream, a linear OTT stream, and a replicated OTT stream.

13. The system of claim 10, wherein the system is further configured to:

compute an estimated number of subscribers viewing the OTT content stream;

compute, based in part on the estimated number of subscribers, a total bandwidth consumption for delivering the OTT content stream in a unicast mode ($BW_{UCST}$) value;

compute a total bandwidth consumption for delivering the OTT content stream in a multicast mode ($BW_{MCST}$) value; and determine the delivery mode to be either the multicast mode or the unicast mode based, in part, on the $BW_{UCST}$ and $BW_{MCST}$ values.

14. The system of claim 13, wherein the estimated number of subscribers is computed based on an adaptive viewing behavior pattern of the OTT multicast stream.

15. The system of claim 10, wherein the adaptive viewing behavior pattern is further determined based on at least one of: prior events related to the OTT multicast stream, geography of the subscribers, and a type of content of the OTT multicast stream.

16. The system of claim 10, wherein the broadband network includes any one of: a cable network, a fiber optic network, a wireless local area network, a digital subscriber line (DSL) network, a cellular network, and any other wireless network.

17. The system of claim 10, wherein the multicast resources availability in the broadband network include a number of available multicast channels in the broadband network.

* * * * *